United States Patent
Cheng

(10) Patent No.: US 8,250,255 B2
(45) Date of Patent: Aug. 21, 2012

(54) TWO-WAY CONNECTIVITY USB CONTROL DEVICE AND OPERATION METHOD THEREOF

(75) Inventor: Chih-Wen Cheng, Hsinchu (TW)

(73) Assignees: DDTIC Corporation Ltd., Hsinchu County (TW); Chih-Wen Cheng, Hsinchu (TW)

( * ) Notice: Subject to any disclaimer, the term of this patent is extended or adjusted under 35 U.S.C. 154(b) by 414 days.

(21) Appl. No.: 12/155,409

(22) Filed: Jun. 4, 2008

(65) Prior Publication Data

US 2008/0307123 A1  Dec. 11, 2008

(30) Foreign Application Priority Data

Jun. 8, 2007 (TW) ................................ 96120859 A

(51) Int. Cl.
   *G06F 13/00* (2006.01)
   *G06F 13/12* (2006.01)
   *G06F 13/38* (2006.01)
(52) U.S. Cl. ............................. 710/31; 710/62
(58) Field of Classification Search .................... 710/62, 710/31

See application file for complete search history.

(56) References Cited

U.S. PATENT DOCUMENTS

| | | | |
|---|---|---|---|
| 7,293,118 B1 * | 11/2007 | Wright | 710/15 |
| 2005/0083741 A1 * | 4/2005 | Chang et al. | 365/200 |
| 2006/0253673 A1 * | 11/2006 | Lee et al. | 711/163 |
| 2007/0255885 A1 * | 11/2007 | Bohm et al. | 710/316 |
| 2008/0046624 A1 * | 2/2008 | Rubin et al. | 710/302 |

FOREIGN PATENT DOCUMENTS

| | | |
|---|---|---|
| TW | 591509 | 6/2004 |
| TW | M276282 | 9/2005 |

OTHER PUBLICATIONS

Universal Serial Bus Specification, Revision 2.0, Apr. 27, 2000, p. 149.*

* cited by examiner

*Primary Examiner* — Chun-Kuan Lee
*Assistant Examiner* — Farley Abad
(74) *Attorney, Agent, or Firm* — Rosenberg, Klein & Lee

(57) ABSTRACT

A two-way connectivity USB control device and its operation method are disclosed. The present invention solves a problem of the prior art that requires users to manually switch a USB controller between an active mode and a passive mode and set a predetermined time interval as in prior art. The two-way connectivity USB control device detects whether or not there is a voltage input. If the detection result is yes, then the two-way connectivity USB control device is switched to a transmit mode, or else the two-way connectivity USB control device is switched to a transparent mode for accessing data stored in an external device by issuing a control command directly.

12 Claims, 4 Drawing Sheets

TWO-WAY CONNECTIVITY USB CONTROL DEVICE AND OPERATION METHOD THEREOF

BACKGROUND OF THE INVENTION

1. Field of the invention

The present invention relates to a USB control device and its operation method, and more particularly to a USB control device and its operation method with a two-way connectivity embedded into a computer system.

2. Description of Related Art

Since the USB specification has the advantages of a plug-and-play function for connecting up to 127 USB devices, supplying a power of 5V, and occupying only one IRQ, the USB are used extensively by users. In existing computer systems, at least one USB port is provided for connecting external devices, and thus manufacturers adopts the concept of transmitting data between computers via a USB interface.

Since the USB interface is of master/client architecture, a data transmission between a computer and a peripheral is performed by a master function provided by the computer and a device function provided by the peripheral.

Therefore, some manufacturers integrate a bridge chip and a USB connecting line to form a USB connecting line with a bridge function, but such arrangement requires a bridge chip and thus incurs a higher cost, and the connecting line with the bridge function is only for a connection between computers. If it is necessary to connect a general USB device, a general USB connecting line is required, and thus the application is very inconvenient.

To solve the foregoing problem, related patents including R.O.C. Pat. No. M276282 entitled "Switching USB access device" are disclosed, and the USB access device 1 of such patent as shown in FIG. 1 comprises a USB interface unit 10, a USB controller 12, a function module 14 and a manual switch 16.

The function module 14 can be a memory for storing an active mode driver 140 and a passive mode driver 142, and the manual switch 16 is used for setting up the USB controller 12 to execute the active mode driver or the passive mode driver, and the USB controller 12 is switched to an active mode or a passive mode.

Further, R.O.C. Pat. No. 591509 entitled "USB control circuit applicable for computer transmissions and operation method thereof" is disclosed, and the USB control circuit of this patent comprises a server controller with a USB interface, a device function circuit and a path switching device, provided for users to specify or automatically detect a data transmission between computers. Users specify a connecting path of the path switching device according to the user's desired connecting peripheral device or according to a computer that would automatically decide on a connecting path, and the automatic decision preset a USB control circuit to be the default active mode, then according to the preset time interval used for setting up a USB control circuit the prior art automatically decide to operate by the active mode or by the device function mode.

When the aforementioned R.O.C. Pat. No. M276282 is practiced, it is necessary to add the manufacturing cost for installing a manual switch on the USB access device, and a user must manually switch to the desired operation mode when a switch is required. Thus, the application is very inconvenient and inefficient to users. The following shortcomings are found in the practice of the R.O.C. Pat. No. 591509. Firstly, the user specified way incurs a higher manufacturing cost for adding a switch. Secondly, an active mode is used for the initial state of the USB control circuit, and a predetermined time interval is used for switching a mode, and thus the setting of timing in the software must be very accurate. If the response time of a connected device exceeds the predetermined time interval, an uncertain status will occur.

SUMMARY OF THE INVENTION

In view of the foregoing shortcomings of the present invention, the inventor of the present invention provides a two-way connectivity USB control device and operation method thereof to determine whether or not the USB control device is switched to a transparent mode or a transmission mode by detecting the voltage. Transparent mode here means the data coming in from one end of the present invention device, such as a first USB port, is not translated and passes directly to the other end of the present invention device, such as a second USB port. While in the transparent mode, the two-way connectivity USB control device acts like a connector between two devices.

Therefore, it is a primary objective of the present invention to overcome the shortcomings of the prior art by providing a two-way connectivity USB control device and its operation method in accordance with the present invention.

To achieve the foregoing objective, the present invention provides a two-way connectivity USB control device, and the two-way connectivity USB control device is embedded into a computer system and comprises: a first USB control unit, electrically coupled to a first USB electronic switch portion; a second USB control unit, electrically coupled to a second USB electronic switch portion; a direction selection unit, electrically coupled to the first USB electronic switch portion and the second USB electronic switch portion, for selecting a data transmission direction between the first USB control unit and the second USB control unit; a memory unit, containing a firmware program code; and a microcontroller unit, electrically coupled to the memory unit, the first USB control unit and the second USB control unit, for carrying out a data transmission between the first USB control unit and the second USB control unit through the USB format contained in the firmware program code.

The present invention further provides an operation method of a two-way connectivity USB control device, and the two-way connectivity USB control device is electrically coupled to a computer system through a first USB port, and a second USB port is electrically coupled to an external device, and the operation method comprises the steps of: detecting whether or not there is a voltage input at the second USB port; switching a first USB electronic switch portion and a second USB electronic switch portion of the two-way connectivity USB control device to a transmission mode; transmitting a control command issued by the second USB port to the first USB port; declaring the computer system in an optical disk mode according to the control command; transmitting a path file information to the computer system and the external device; waiting for an operation control command transmitted from the computer system or the external device; determining whether or not the operation control command is a file transmission command; and executing a file transmission operation between the computer system and the external device.

The two-way connectivity USB control device and operation method thereof of the present invention can overcome the shortcomings of prior art, the present invention provides a voltage detection method to solve the problem of the R.O.C. Pat. No. 591509 that produces an uncertain status when the response time of the connected device exceeds a predetermined time interval, and the USB control device does not have any switch, and thus saving the manufacturing cost of producing the switch.

To make it easier for our examiner to understand the expected effect, technical measure and performance of the present invention, we use a preferred embodiment accompanied with related drawings for the detailed description of the present invention as follows. However, the drawings are primarily for the reference and illustration purposes only, but not intended for limiting the scope of the present invention.

DETAILED DESCRIPTION OF THE PREFERRED EMBODIMENTS

Figure 1:
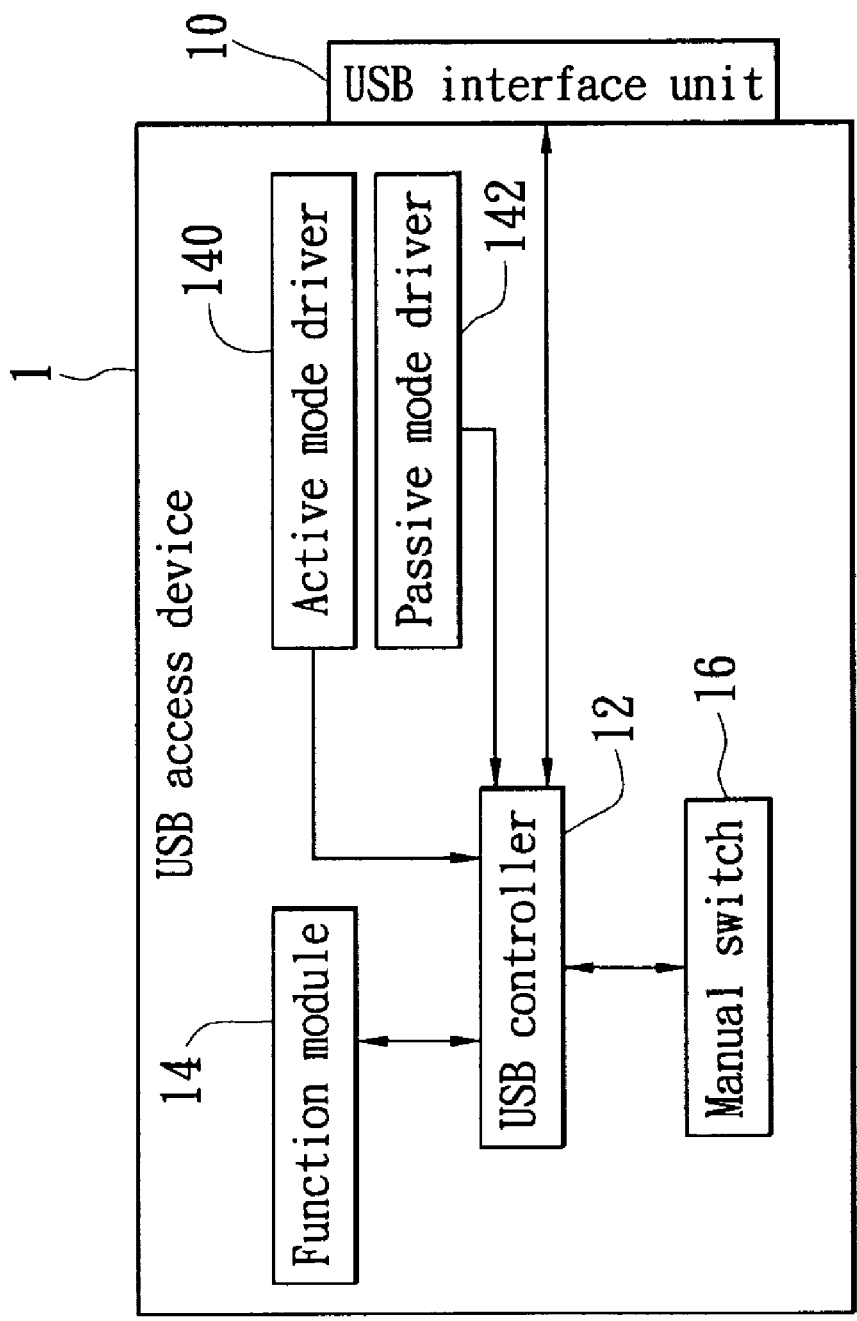
FIG. 1 is a schematic view of a USB access device of a prior art.
Figure 2:
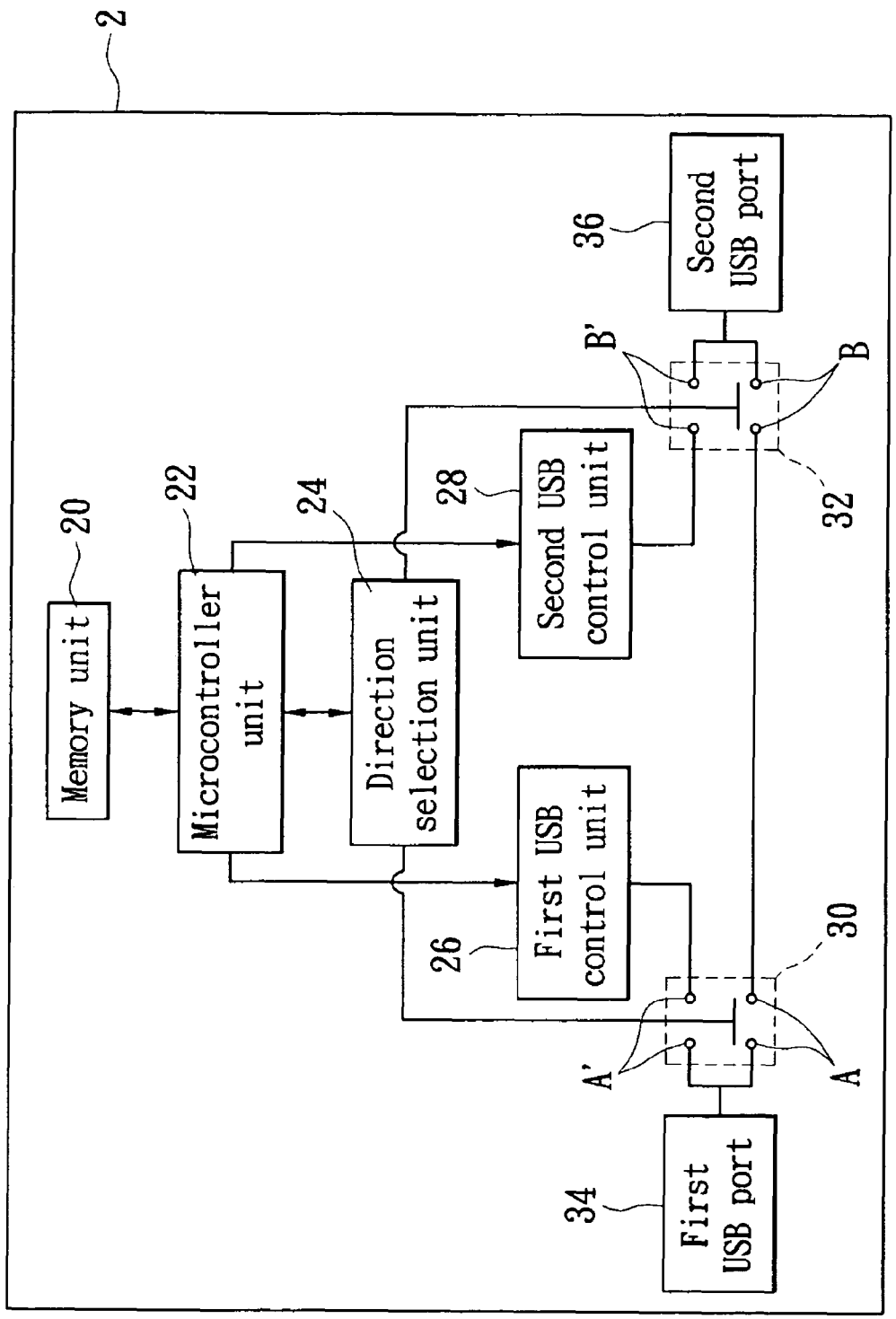
FIG. 2 is a schematic view of a two-way connectivity USB control device in accordance with the present invention.

Referring to FIG. 2 for a schematic view of a two-way connectivity USB control device in accordance with the present invention, the two-way connectivity USB control device 2 comprises a memory unit 20, a microcontroller unit 22, a direction selection unit 24, a first USB control unit 26, a second USB control unit 28, a first USB electronic switch portion 30, a second USB electronic switch portion 32, a first USB port 34 and a second USB port 36.

In FIG. 2, the first USB control unit 26 is electrically coupled to an end of the first USB electronic switch portion 30, and another end of the first USB electronic switch portion 30 is electrically coupled to the first USB port 34. An end of the second USB control unit 28 is electrically coupled to the second USB electronic switch portion 32, and another end of the second USB electronic switch portion 32 is electrically coupled to second USB port 36. The first USB electronic switch portion 30 and second the USB electronic switch portion 32 are activated for switching if a voltage inputted from the first USB port 34 and the second USB port 36 is inputted.

The direction selection unit 24 is electrically coupled to the first USB electronic switch portion 30 and the second USB electronic switch portion 32 for selecting a data transmission direction between the first USB control unit 26 and the second USB control unit 28, and the interior of the direction selection unit 24 includes a voltage detection circuit (not shown in the figure) for detecting whether or not the first USB electronic switch portion 30 or the second USB electronic switch portion 32 has a voltage input, and the voltage detection circuit is comprised of a diode and a voltage comparator.

The memory unit 20 includes a firmware program code, and the firmware program code contains commands coded in the USB format, and the memory unit 20 is a flash memory or any other non-volatile memory. The microcontroller unit 22 is electrically coupled to the memory unit 20, the first USB control unit 26 and the second USB control unit 28. With the USB format of the firmware program code, data are transmitted between the first USB control unit 26 and the second USB control unit 28 in the USB format.

The method of applying the two-way connectivity USB control device of the present invention is described as follows. The first USB port 34 of the two-way connectivity USB control device is connected with a computer system, and the second port 36 is connected with an external device, such that if the external device connected to the second USB port 36 supplies a voltage input, the voltage detection circuit installed in the direction selection unit 24 will detect the voltage input, and the direction selection unit 24 will switch an electronic switch originally connecting Point A of the first USB electronic switch portion 30 and Point B of the second USB electronic switch portion 32 to instead connecting Point A' of the first USB electronic switch portion 30 and Point B' of the second USB electronic switch portion 32 respectively (the above described operation is the transparent function). If the external device connected to the second USB port 36 issues a control command, the microcontroller unit 22 will transmit the control command to the first USB port 34 according to the USB format of the firmware program code, and an application program installed in the computer system will carry out the related file transmission function.

Figure 3:
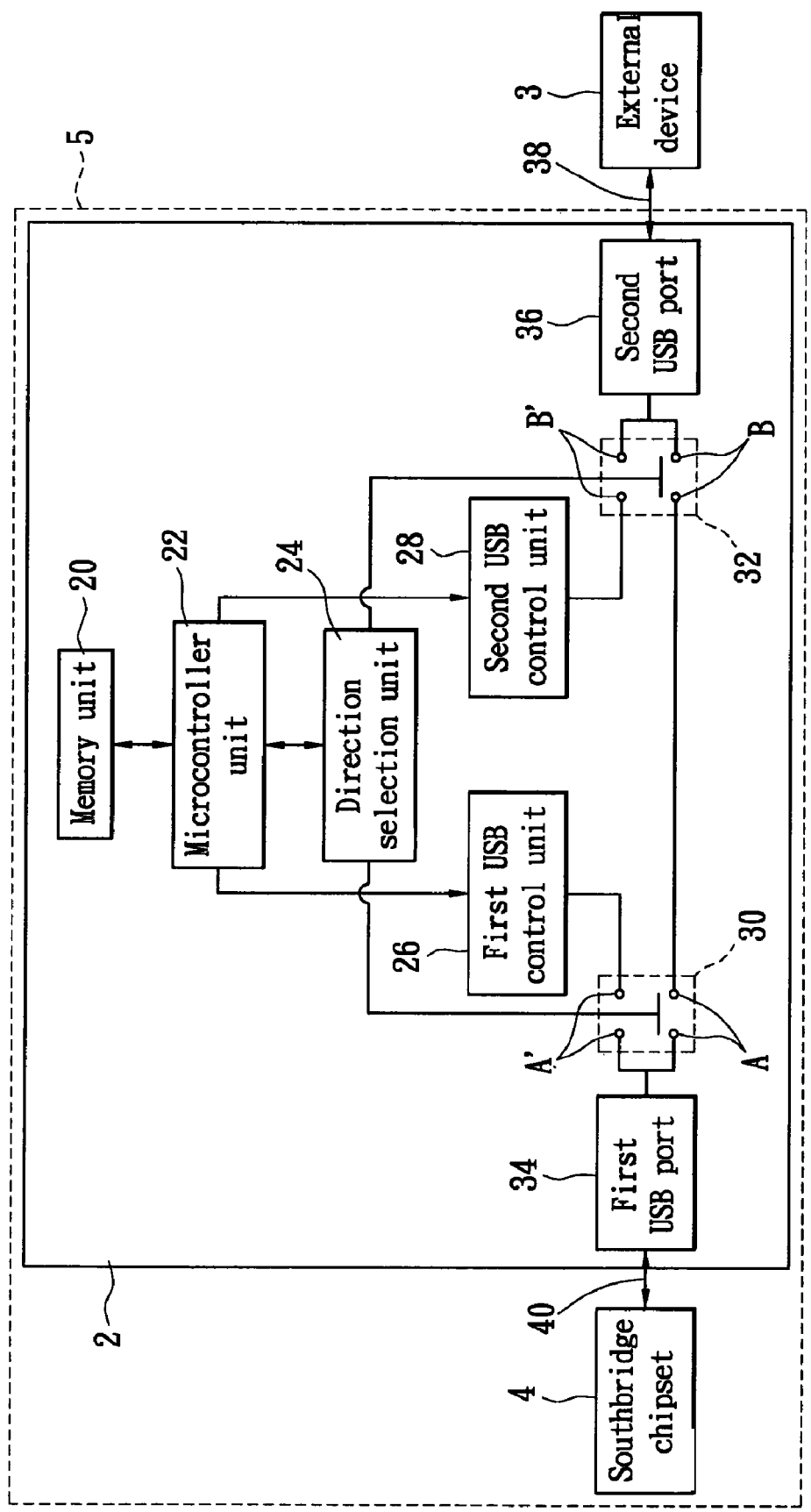
FIG. 3 is a schematic view of a computer system applying a two-way connectivity USB control device in accordance with the present invention.

Referring to FIG. 3 for a schematic view of a computer system applying a two-way connectivity USB control device in accordance with the present invention, the two-way connectivity USB control device is integrated into a system on a chip and embedded into a computer system or an electronic device, and the system comprises a two-way connectivity USB control device 2, a Southbridge chipset 4, a bus interface 40, a USB data transmission line 38 and an external device 3.

Of course, a computer system does not simply have an electronic component such as the Southbridge chipset 4 only, but those skilled in the art know that the computer system also includes a memory, a floppy disk drive, a hard disk, a Northbridge chipset, a bus slot, and a central processing unit and other components, wherein the hard disk stores a software program, but these are outside the scope of the present invention.

The two-way connectivity USB control device 2 comprises a memory unit 20, a microcontroller unit 22, a direction selection unit 24, a first USB control unit 26, a second USB control unit 28, a first USB electronic switch portion 30, a second USB electronic switch portion 32, a first USB port 34 and a second USB port 36. The first USB port 34 of the two-way connectivity USB control device 2 is electrically coupled with the Southbridge chipset 4 through the bus interface 40, and the bus interface 40 can support PCI or PCI extended interface, and the two-way connectivity USB control device 2 can be integrated into the interior 5 of the computer system to become a part of the computer system. In addition, the second USB port 36 of the two-way connectivity USB control device 2 is electrically coupled to the external device 3 through the USB data transmission line 38, and the USB data transmission line 38 is a general USB cable available in the market, and the external device 3 can be a computer system or a USB device without a power supply.

Figure 4:
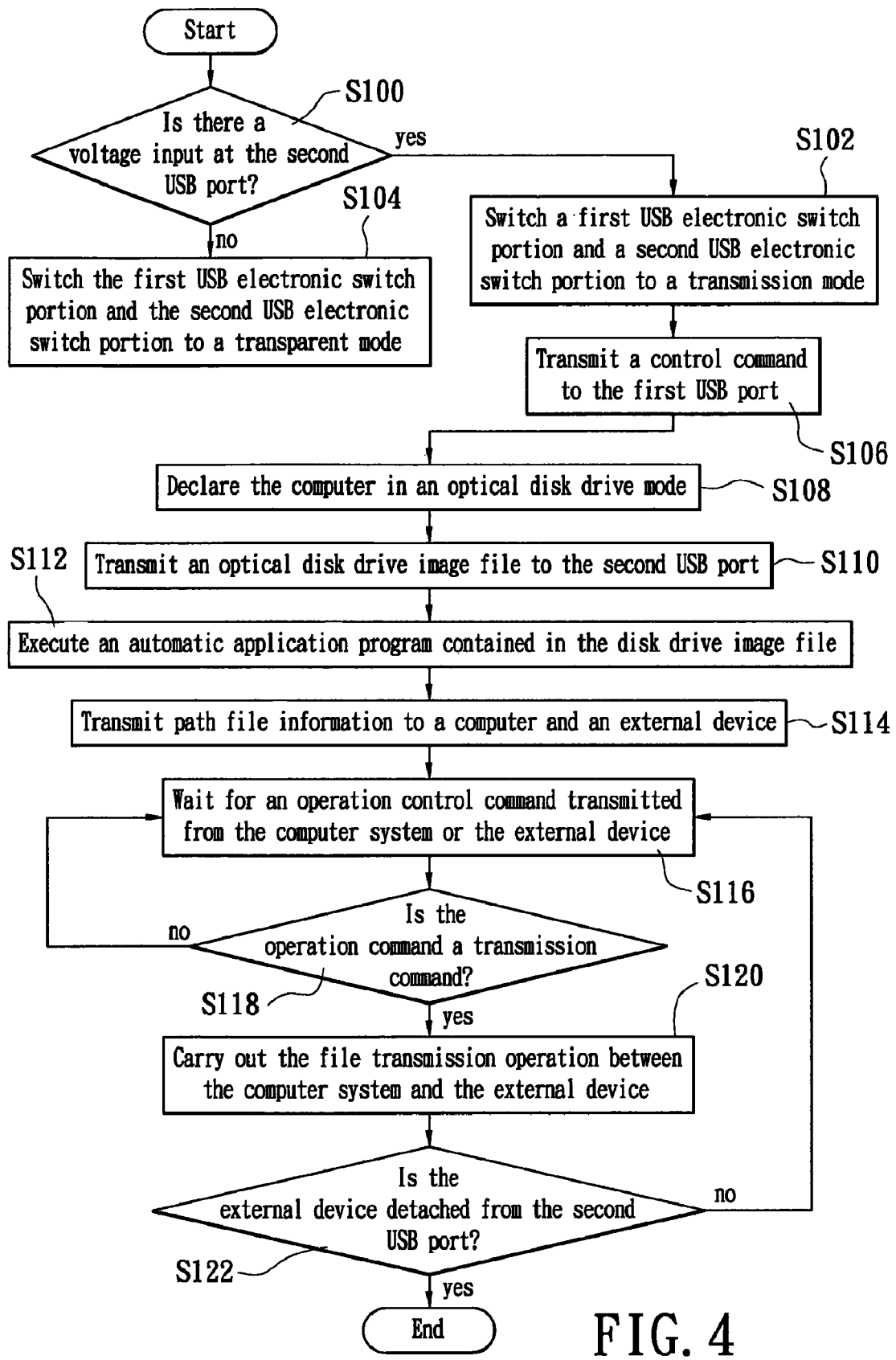
FIG. 4 is a flow chart of a method of applying a two-way connectivity USB control device in accordance with the present invention.

Referring to FIGS. 3 and 4, FIG. 4 shows a flow chart of a method for applying the two-way connectivity USB control device in accordance with the present invention, the two-way connectivity USB control device 2 is electrically coupled to the Southbridge chipset 4 of the computer system through the bus interface 40 and through the first USB port 34, and the second USB port 36 is electrically coupled to the external device 3. The operation method comprises the following steps.

In Step (S100), the step detects whether or not the external device 3 supplied a voltage input from the second USB port 36 through the USB data transmission line 38 (S100), wherein the detection is done by a voltage detection circuit installed in the direction selection unit 24. In an initial state, the first USB electronic switch portion 30 and the second USB electronic switch portion 32 of the invention are electronic switches that completes the connecting at Points A and at B respectively.

In the detection step (S100), if the voltage detection circuit detects a voltage input, the two-way connectivity USB control device 2 will switch the first USB electronic switch portion 30 and the second USB electronic switch portion 32 to a transmission mode (S102). In other words, the electronic switches of the first USB electronic switch portion 30 and the second USB electronic switch portion 32 are switched from Points A and B to Points A' and B' respectively. Now, we know that the external device 3 is a device with an active power supply such as a computer system. On the other hand, if the voltage detection circuit has not detected a voltage input in the detection step (S100), then the first USB electronic switch portion 30 and the second USB electronic switch portion 32 of the two-way connectivity USB control device will be in a transparent mode (S104). In other words, the initial state of the first USB electronic switch portion 30 and the second USB electronic switch portion 32 is maintained.

In Step (S104), the voltage detection circuit has not detected a voltage input, indicating that the external device 3 is a device with a passive power supply such as a USB flash or another storage device. After the step (S104), the first USB electronic switch portion 30 and the second USB electronic switch portion 32 of the two-way connectivity USB control device are in a transparent mode. In other words, the first USB port 34 and the second USB port 36 are connected directly, and the computer system can issue a control command directly to the external device 3. For example, a user issues a data control command to an input device (such as a keyboard or a mouse) of a computer system, so that the computer system can access the data stored in the external device 3.

After the Step (S102), the external device 3 will transmit a control command issued by the external device 3 to the first USB port 34 through the second USB port 36 (S106). Now, the microcontroller unit 22 of the two-way connectivity USB control device 2 will activate a firmware program code stored in the memory unit 20, wherein the firmware program code contains a command coded in a USB format, and the control command is packaged into a control command in the USB format, and the packaged control command is transmitted by the first USB port 34 to the computer system through the bus interface 40, and the computer system includes a software program such that after the computer system receives the packaged control command, the software program of the computer system will declare the computer system to be in an optical disk mode according to the packaged control command (S108), and inform the external device 3 that the computer system is in the optical disk mode.

The computer system will transmit an optical disk driver image file to the second USB port 36 through the first USB port 34 (S110). After the optical disk driver image file is received by the external device 3 and stored into a memory, the external device 3 immediately execute an automatic application program contained in the optical disk driver image file (S112). With the automatic execution of the application program, the computer system transmits a path file information to the external device 3 and displays the information on a display screen of the computer system and a display screen of the external device 3 respectively (S114). Wait for an operation control command transmitted from the computer system or the external device 3 (S116). If the computer system or the external device 3 sends out the operation control command, the computer system or the external device 3 will determine whether or not the operation control command is a file transmission command (S118). If the determination result is negative, then return to the step of waiting for an operation control command transmitted from the computer system or transmitted from the external device 3 (S116). If the determination result is affirmative, then execute the file transmission operation between the computer system and the external device 3 (S120). Finally after step (S120), the two-way connectivity USB control device determines whether or not the external device 3 is detached from the second USB port 36 (S122). If the determination result is affirmative, the whole operation procedure will be ended. On the other hand, if the determination result is negative, return to the step of waiting for an operation control command transmitted from the computer system or the external device 3 (S116).

Unlike the R.O.C. Pat. No. 591509, the two-way connectivity USB control device of the present invention has no manual switch, and the present invention simply uses the existence of a voltage input as the determination condition to drive the electronic switches of the first USB electronic switch portion and the second USB electronic switch portion for the switching process, and thus the present invention does not have the drawbacks of the R.O.C. Pat. No. 591509. Such that if the response time of a connected device exceeds a predetermined time interval, an uncertain status will occur. The method of operating the two-way connectivity USB control device in accordance with the present invention can display the path file information on the computer system and the external device simultaneously for the file transmission function.

Although the present invention has been described with reference to the preferred embodiments thereof, it will be understood that the invention is not limited to the details thereof. Various substitutions and modifications have been suggested in the foregoing description, and others will occur to those of ordinary skill in the art. Therefore, all such substitutions and modifications are intended to be embraced within the scope of the invention as defined in the appended claims.

What is claimed is:

1. A two-way connectivity universal serial bus (USB) control device, embedded into a computer system, comprising:
    a first USB control unit, electrically coupled to a first USB electronic switch portion, wherein the first USB electronic switch portion is coupled to the computer system;
    a second USB control unit, electrically coupled to a second USB electronic switch portion, wherein the second USB electronic switch portion is coupled to an external device;
    a direction selection unit, electrically coupled to the first USB electronic switch portion and the second USB electronic switch portion for selecting a data transmission direction between the first USB control unit and the second USB control unit, and for detecting if there is a voltage input at the second USB electronic switch portion before switching the first USB electronic switch portion and the second USB electronic switch portion between a transparent mode and a transmission mode;
    a memory unit, containing a firmware program code; and
    a microcontroller unit, electrically coupled to the memory unit, the first USB control unit and the second USB control unit, for transmitting data in a USB format contained in the firmware program code between the first USB control unit and the second USB control unit;
    wherein when the first USB electronic switch portion and the second USB electronic switch portion are at the transmission mode at the time the voltage input is detected at the second USB electronic switch portion, the two-way connectivity USB control device determines the data transmission direction between the first USB control unit and the second USB control unit and either the first USB control unit or the second USB control unit initiates a file transmission operation, and when the first USB electronic switch portion and the second USB electronic switch portion are at the transparent mode only the first USB control unit initiates the file transmission operation, with the two-way connectivity USB control device determining the data transmission between the first USB control unit and the second USB control unit.

2. The two-way connectivity USB control device of claim 1, wherein the direction selection unit includes a voltage detection circuit for detecting whether or not there is the voltage input at the second USB electronic switch portion.

3. The two-way connectivity USB control device of claim 2, wherein the voltage detection circuit is comprised of a diode and a voltage comparator.

4. The two-way connectivity USB control device of claim 1, wherein the two-way connectivity USB control device is integrated into a system on a chip.

5. An operation method of a two-way connectivity universal serial bus (USB) control device, the two-way connectivity USB control device is electrically coupled to a computer system through a first USB port and electrically coupled to an external device through a second USB port, and the operation method comprising:
   detecting whether or not there is a voltage input at the second USB port;
   switching a first USB electronic switch portion and a second USB electronic switch portion of the two-way connectivity USB control device between a transmission mode and a transparent mode according to whether or not there is the voltage input at the second USB port;
   transmitting a control command issued by the external device via the second USB port to the computer system via the first USB port, or transmitting the control command issued by the computer system via the first USB port to the external device via the second USB port, and packaging the control command into a USB format;
   when the control command is issued by the external device transmitting a path file information to the computer system, otherwise transmitting the path file to the external device;
   waiting for an operation control command transmitted from the computer system or the external device;
   determining whether or not the operation control command is a file transmission command; and
   enabling a file transmission operation between the computer system and the external device, wherein the file transmission operation is initiated either from the computer system or the external device when the first USB electronic switch portion and the second USB switch portion are at the transmission mode at the time the voltage input is detected at the second USB electronic switch portion, otherwise the file transmission operation is initiated only by the computer system to the external device when the first USB switch portion and the second USB switch portion are at the transparent mode.

6. The operation method of a two-way connectivity USB control device of claim 5, wherein if the determination result in the step of detecting whether or not there is the voltage input at the second USB port is affirmative, then the first USB electronic switch portion and the second USB electronic switch portion of the two-way connectivity USB control device are switched to the transmission mode, or otherwise the first USB electronic switch portion and the second USB electronic switch portion of the two-way connectivity USB control device are switched to the transparent mode.

7. The operation method of a two-way connectivity USB control device of claim 5, further comprising the steps based on the control command of:
   transmitting an optical disk driver image file to the second USB port through the first USB port; and
   executing an application program of the optical disk driver image file automatically.

8. The operation method of a two-way connectivity USB control device of claim 5, further comprising a step of detecting whether or not the external device is disconnected.

9. The operation method of a two-way connectivity USB control device of claim 8, wherein when a detection result in the step of detecting whether or not the external device is disconnected is affirmative determines whether or not there is the voltage input at the second USB port, or otherwise waits for the operation control command transmitted from the computer system or from the external device.

10. The operation method of a two-way connectivity USB control device of claim 5, wherein when a determination result in the step of determining whether or not the operation control command is the file transmission command is affirmative enables the file transmission operation between the computer system and the external device or otherwise waits for the operation control command transmitted from the computer system or the external device.

11. The operation method of a two-way connectivity USB control device of claim 5, further comprising a step of determining whether or not the external device is detached from the second USB port.

12. The operation method of a two-way connectivity USB control device of claim 11, wherein when a determination result in the step of determining whether or not the external device is detached from the second USB port is affirmative stops an operation, or otherwise waits for the operation control command transmitted from the computer system or the external device.

* * * * *